(12) United States Patent
Ansel et al.

(10) Patent No.: US 8,850,574 B1
(45) Date of Patent: Sep. 30, 2014

(54) SAFE SELF-MODIFYING CODE

(75) Inventors: Jason Ansel, Cambridge, MA (US); Cliff L. Biffle, Berkeley, CA (US); Ulfar Erlingsson, Palo Alto, CA (US); David C. Sehr, Cupertino, CA (US)

(73) Assignee: Google Inc., Mountain View, CA (US)

( * ) Notice: Subject to any disclaimer, the term of this patent is extended or adjusted under 35 U.S.C. 154(b) by 685 days.

(21) Appl. No.: 13/037,085

(22) Filed: Feb. 28, 2011

(51) Int. Cl.
*G06F 21/00* (2013.01)

(52) U.S. Cl.
USPC ............. 726/22; 717/107; 717/141; 717/146; 717/148; 717/154; 717/159

(58) Field of Classification Search
USPC ............. 726/21, 22-25; 712/208, 1; 717/146, 717/141, 154, 107, 148, 159
See application file for complete search history.

(56) References Cited

U.S. PATENT DOCUMENTS

| | | | |
|---|---|---|---|
| 6,393,549 B1 | 5/2002 | Tran et al. | |
| 6,851,108 B1 * | 2/2005 | Syme et al. | 717/146 |
| 7,882,317 B2 | 2/2011 | Hunt et al. | |
| 7,934,204 B2 | 4/2011 | Brown et al. | |
| 8,561,183 B2 * | 10/2013 | Muth et al. | 726/22 |
| 8,595,832 B1 | 11/2013 | Yee et al. | |
| 8,621,619 B2 * | 12/2013 | Yee et al. | 726/22 |
| 2009/0282477 A1 * | 11/2009 | Chen et al. | 726/22 |
| 2010/0011209 A1 | 1/2010 | Kiriansky et al. | |
| 2010/0138817 A1 * | 6/2010 | Dubinsky et al. | 717/148 |

OTHER PUBLICATIONS

Ansel et al., "Language-Independent Sandboxing of Just-In-Time Compilation and Self-Modifying Code", PLDI'11, ACM. pp. 1-12.*
Myreen, "Verified Just-In-Time Compiler on x86," in Proc. of POPL '10, Jan. 17-23, 2010, 107-118.
Cai et al., "Certified self-modifying code," in Proc. PLDI'07, Jun. 11-13, 2007, 66-77.
Criswell et al., "Memory Safety for Low-Level Software/Hardware Interactions," In Proceedings of the 18th conference on USENIX security symposium (SSYM'09), 2009, 83-100.
Abadi et al., "Control-Flow Integrity: Principles, Implementations, and Applications," ACM Transactions on Information and System Security, vol. 13, No. 1, Article 4, Oct. 2009, 1-40.
Sehr et al., "Adapting Software Fault Isolation to Contemporary CPU Architectures," 19th USENIX Security Symposium Aug. 11, 2010, 1-11.

* cited by examiner

*Primary Examiner* — Hadi Armouche
*Assistant Examiner* — Hee Song
(74) *Attorney, Agent, or Firm* — Fish & Richardson P.C.

(57) ABSTRACT

Methods, systems, and apparatus, including computer programs encoded on a computer storage medium, for runtime language-independent sandboxing of software. In one aspect, a system implements an extended Software Fault Isolation (SFI) software sandboxing system configured to provide a user-mode program interface for receiving runtime requests for modifying verifiably safe executable machine code. Requests can include dynamic code creation, dynamic code deletion, and atomic modification of machine code instructions. A runtime modification of a verifiably safe executable memory region is made in response to each received runtime request, and code within the modified memory region has a guarantee of safe execution.

36 Claims, 7 Drawing Sheets

SAFE SELF-MODIFYING CODE

BACKGROUND

This specification relates to modifying code.

Conventionally, when dealing with untrusted content, e.g., on the web, software behavior is sandboxed in order to minimize the likelihood of security risks from both hardware and software attacks. Typically, sandboxing is performed using a specially-designed language (e.g., JavaScript). However, language-based sandboxing alone does not ensure the safety of highly optimized, dynamic language runtimes that rely on advanced techniques such as Just-In-Time (JIT) compilation and large libraries of native-code support routines. In particular, each new runtime presents a new potential security risk.

One conventional mechanism for providing language-independent sandboxing of software is Software Fault Isolation (SFI). SFI is a traditionally static technique that provides an inductive guarantee of machine code execution safety after performing an analysis of executable code to verify that the code meets a set of safety constraints. However, this guarantee cannot be sustained if the code is modified during runtime.

SUMMARY

This specification describes technologies relating to runtime language-independent sandboxing of software.

In general, one aspect of the subject matter described in this specification can be embodied in systems that include one or more computers and one or more storage devices storing instructions that are operable, when executed by the one or more computers, to cause the one or more computers to implement an extended Software Fault Isolation (SFI) software sandboxing system configured to perform actions including providing a user-mode program interface for receiving runtime requests for modifying verifiably safe executable machine code wherein the requests include dynamic code creation, dynamic code deletion, and atomic modification of machine code instructions; and, for each runtime request, performing runtime modification of a verifiably safe executable memory region in response to receiving the request wherein code within the modified verifiably safe executable memory region has a guarantee of safe execution. Other embodiments of this aspect include corresponding methods, apparatus, and computer program products.

These and other embodiments can optionally include one or more of the following features. For each runtime request that is a dynamic code creation request, performing runtime modification of the verifiably safe executable memory region includes: receiving data associated with the code creation request, the data comprising machine code to install and a code installation target address in executable memory; verifying that the target address is located within memory in an executable segment of a trusted sandbox; copying the code to install to private memory located outside of the trusted sandbox; validating the code to install by using a trusted SFI validator; determining a target address range within which the code will be installed; performing an operation on the target address range to verify that the target address range is currently unused memory and to reserve the target address range for code installation; and copying the verified code to the target address.

Where the verified code comprises at least one instruction bundle, copying the verified code to the target memory includes: filling the target memory with halt (HLT) instructions; and copying each verified code instruction bundle to the target memory by: writing the instruction bundle first byte to the target memory as a JLT instruction, copying all instruction bundle bytes after the first byte to the target memory, and replacing the first byte HLT instruction with the instruction bundle first byte.

For each runtime request that is a dynamic code deletion request, performing runtime modification of a verifiably safe executable memory region includes: receiving a specification of a code region to delete from executable memory; safely deleting code from the specified code region; and verifying that the specified code region is safe for reuse by establishing that no active threads are executing instructions within the specified code region.

Where the specified code region includes a plurality of contiguous instruction bundles, safely deleting code from the specified code region includes: writing a HLT instruction at the start of each of the instruction bundles; and deleting each of the instruction bundles.

Establishing that no active threads are executing instructions within the specified code region includes: incrementing a system global generation number; assigning the global generation number to the code region delete generation; enumerating the system active threads; updating a thread generation number for an active thread in response to the thread making a call into verifiably safe system runtime; determining whether each of the active threads has a generation number that is great than or equal to the code region delete generation; and verifying that no active thread are executing instructions within the specified code region if each of the active threads has a generation number that is greater than or equal to the code region delete generation.

Establishing that no active threads are executing instructions within the specified code region alternatively includes filling the specified code region with HLT instructions; enumerating the system threads; determining whether each of the system threads is an active thread; and establishing that no active threads are executing instructions within the specified code region if each of the system threads is an active thread.

For each runtime request that is an atomic modification of machine code instructions request, performing runtime modification of the verifiably safe executable memory region includes: receiving data associated with the atomic modification of machine code instructions request, the data comprising target instructions to be replaced and new instructions to replace the target instructions (the target instructions are located within an instruction bundle that is located within the verifiably safe executable memory region); and modifying the instruction bundle by replacing the target instructions with the new instructions.

Modifying the instruction bundle includes validating machine code instructions. Validating machine code instructions includes verifying that the machine code instructions satisfy at least one or more safety constraints including: the target instructions and the new instructions start at the same address, are of equal size, and are located within a single code region; any new direct control-transfer instructions target valid instruction boundaries in the verifiably safe memory region; the target instructions and the new instructions start and end at instruction boundaries, and if one or more instruction boundaries are between the start and the end, the one or more instruction boundaries are identical in the target instructions and the new instructions; pseudo-instructions are neither added nor removed from the instruction bundle; and each new pseudo-instruction and corresponding target pseudo-instruction being replaced must have identical guard instructions.

Replacing a target instruction with a new instruction includes; changing the first byte of the target instruction to a HLT instruction; executing a first hardware threads serialization barrier; replacing all target instruction bytes except for the HLT instruction byte with corresponding new instruction bytes; executing a second hardware threads serialization barrier; and replacing the HLT instruction byte with the new instruction first byte.

Executing the hardware threads serialization barrier is triggered as a side-effect of invoking a system call to modify page tables. Alternatively, executing the hardware threads serialization barrier includes sending blanket thread notifications in response to invoking a user-mode instruction.

Particular embodiments of the subject matter described in this specification can be implemented so as to realize one or more of the following advantages. Embodiments provide a flexible form of SFI for safe, efficient, language-independent sandboxing of advanced software by adding new constraints and mechanisms that allow safety to be guaranteed despite runtime code modifications. The entirety of dynamic software execution can be sandboxed, including the language platform even if software execution includes just-in-time compilation, runtime code modification, or large bodies of legacy code. Overheads for using the extended SFI are low, so that performance impact is minimal. The new safety constraints on the structure of machine code are verified only when code is modified, not when code is used.

The extended sandbox transparently allows safe reuse of code memory without race conditions and without suspending threads, even on hardware-threaded, concurrent systems. The extended SFI system can be implemented independent of the operating system and other system-level details. The new safety constraints depend on the structure of machine code and apply, inductively, even across code modifications.

The details of one or more embodiments of the subject matter described in this specification are set forth in the accompanying drawings and the description below. Other features, aspects, and advantages of the subject matter will become apparent from the description, the drawings, and the claims.

DESCRIPTION OF THE DRAWINGS

Like reference symbols in the various drawings indicate like elements.

DETAILED DESCRIPTION

This specification describes systems and methods for modification of verifiably safe machine code executing within runtime memory. Verifiably safe machine code is code that is determined to meet a set of one or more safety constraints. The code modified at runtime inductively has the same guarantees of safe code execution that would be provided by a conventional Software Fault Isolation (SFI) after performing a static analysis of executable code. An SFI analysis system (e.g., Native Client) is extended to provide a user-mode programmatic interface to methods that can be invoked at runtime to create a new verifiably safe code region within executable memory, safely delete a verifiably safe code region and free the executable memory for reuse, and make safe, atomic runtime modifications of verifiably safe machine code instructions.

Figure 1:
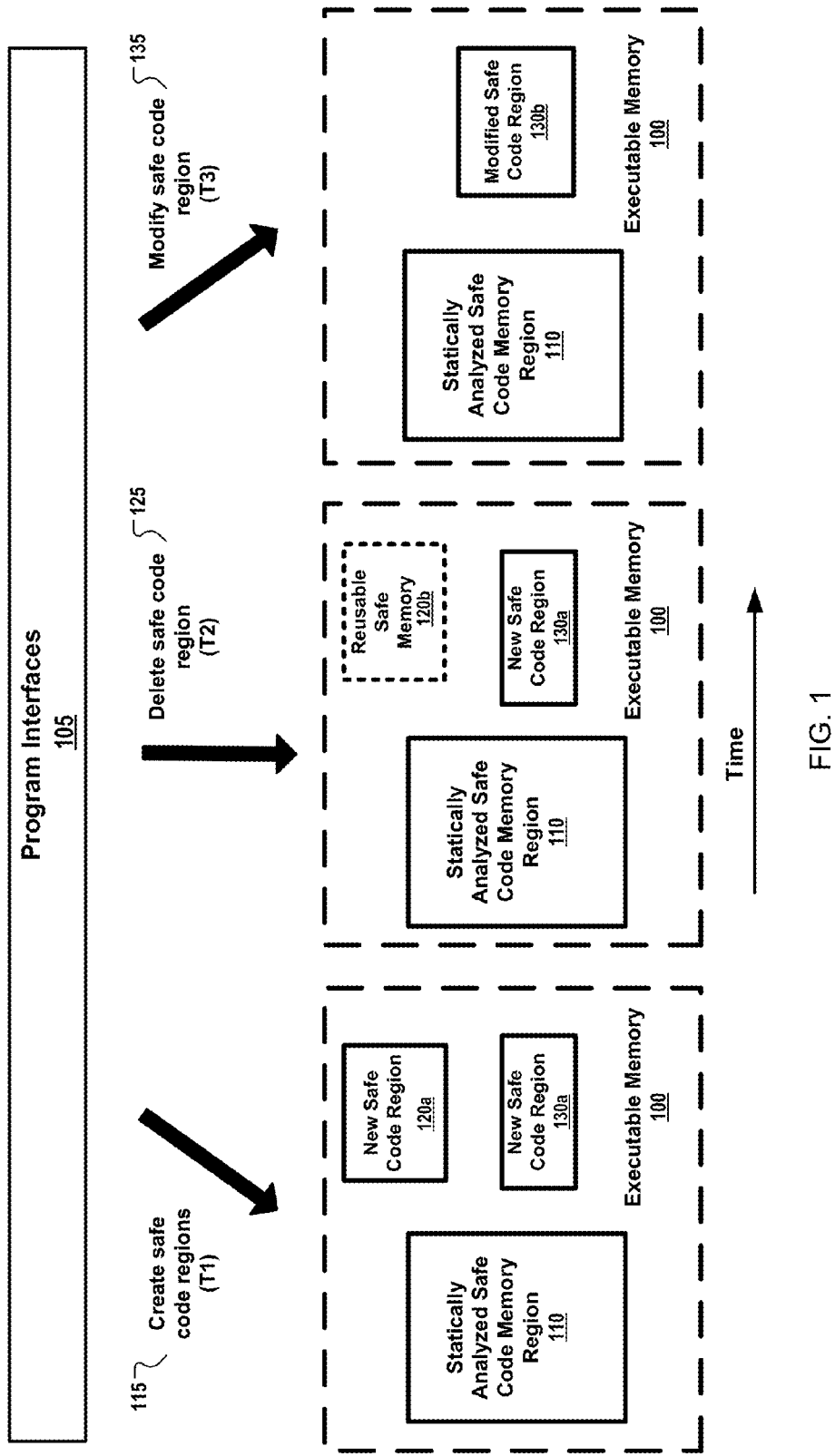
FIG. 1 illustrates example scenarios in which different types of runtime modifications to verifiably safe code regions are made within a region of executable memory.

FIG. 1 illustrates example scenarios in which different types of runtime modifications to verifiably safe code regions are made within a region of executable memory 100. Software fault isolation (SFI), which relies on machine code verification through static analysis of executable code, can be used to provide an inductive guarantee of safe code execution within a verifiably safe "sandbox" executable memory region by constraining execution of verified machine code, regardless of the language from which it was created. The example executable memory 100 contains a verifiably safe sandbox memory region 110, verified for safe code execution by an implementation of a SFI system. One example SFI system implementation is Native Client (NaCl), which is described, for example, in D. Sehr, R. Muth, C. Biffle, V. Khimenko, E. Pasko, K. Schimpf, B. Yee, and B. Chen, "Adapting Software Fault Isolation to Contemporary CPU Architectures," 19th USENIX Security Symposium 2010.

An SFI system can be extended to enable additional safe sandboxing of runtime mechanisms (e.g., just-in-time (JIT) code generation) and of runtime code modification. FIG. 1 illustrates a scenario in which program interfaces 105 (e.g., a set of method calls) of an extended SFI system are invoked at runtime to create 115 new verifiably safe code regions 120a and 130a within executable memory 100; to delete 125 a dynamically created verifiably safe code region 120b from executable memory 100 and thus free the deleted code region memory 120b for reuse; and to modify 135 a dynamically created verifiably safe code region 130b within executable memory 100. The dynamically created verifiably safe code regions 120a and 130a have the same inductive safety guarantees for language-independent constrained execution of machine code as the guarantees for the statically analyzed and verified sandbox region 110.

Table 1 provides three example NaCl extension interfaces for programmatic access of safe runtime verifiably safe code modification methods.

TABLE 1

Example NaCl extension interfaces

```
int nacl_dyncode_create ( void * target ,
                          void * src, void* src_metadata,
                          size_t size );
int nacl_dyncode_modify ( void * target ,
                          void * src , void* src_metadata,
                          size_t size );
int nacl_dyncode_delete ( void * target ,
                          size_t size );
```

As an example, consider, within the context of the FIG. 1 scenario, using the example extension interfaces in Table 1 for a JIT compilation of a single function within an extended NaCl runtime. Time progression in FIG. 1 is from left to right. The JIT compiler, running as untrusted NaCl code, generates machine code in a temporary buffer in data memory. At a time T1, the JIT invokes nacl_dyncode_create to install 115 the generated code in executable memory 100, transferring control into the NaCl verifiably safe runtime sandbox 110. This verifiably safe runtime validates the code and installs it as a verifiably safe code region 120a in executable memory 100.

If at some time T2 a particular verifiably safe code region (e.g., code region 120a) is no longer needed, the code region can be deleted so that the corresponding memory can be reused. For example, as shown in FIG. 1, reusable memory 120b can be available for installation of new machine code after the JIT invokes nacl_dyncode_delete to delete 135 the verifiably safe code region 120a from the executable memory 100. New verifiably safe machine code can be installed within a verifiably safe code region that encompasses some or all of the memory of the deleted code region.

At a later time T3, the JIT may attempt to modify 125 the code within a verifiably safe code region (e.g., update a pointer address stored in an immediate pointer). The JIT invokes nacl_dyncode_modify to perform these modifications of the code within verifiably safe code region 130a, generating the modified verifiably safe code region 130b within the executable memory 100.

Figure 2A:
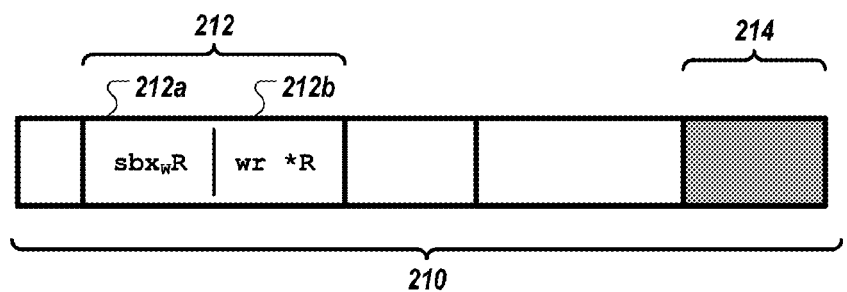
FIG. 2A illustrates an example instruction set bundle containing five instructions.
Figure 2B:
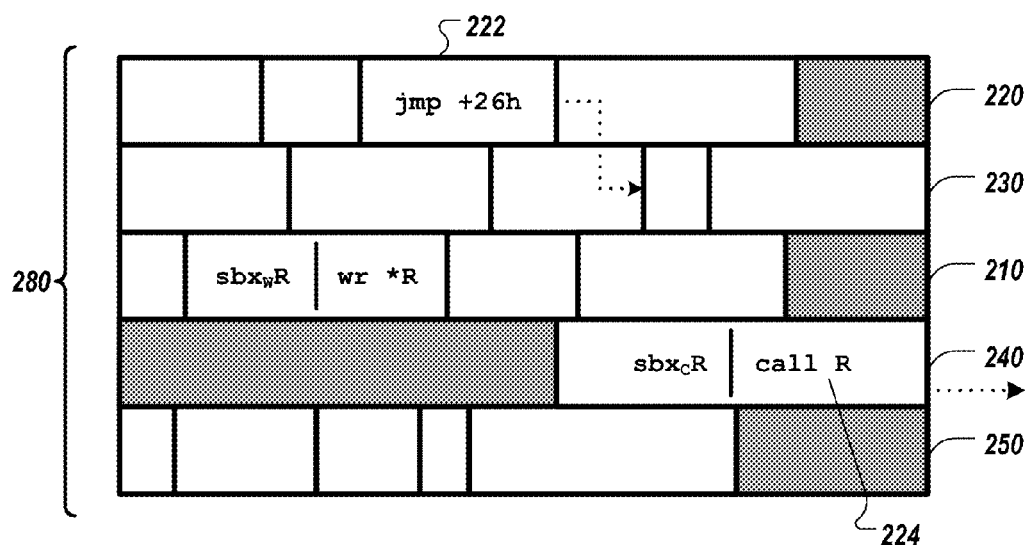
FIG. 2B illustrates an example verifiably safe code region that is composed of five contiguous instruction set bundles.

FIG. 2A and FIG. 2B provide an example overview of the structure of verifiably safe machine code and verifiably safe machine code regions that can be modified dynamically at runtime (e.g., by invoking an interface provided by an extended SFI system). FIG. 2A illustrates an example instruction set bundle 210 containing five instructions (the instructions are identified by the first five blocks in the bundle 210). One of the instructions in the example bundle 210 is a pseudo-instruction 212, an instruction that is composed of two parts: a guard instruction 212a and a tail instruction 212b. Not all bundles include pseudo-instructions. Other types of instructions that can be included in an instruction set bundle include control flow instructions (e.g. a jump instruction), examples of which are described below.

In some alternative implementations, pseudo-instructions need not include individual, adjacent instructions. Rather, both the guard and the tail may include a straight-line sequence of several instructions, and the guard may be separate from the tail, as long as dynamically, at runtime, the guard is always executed before the tail. In such non-adjacent implementations, a single guard can cover multiple tails, and a single tail can be associated with multiple guards—as long as at least one appropriate guard is executed at runtime before any given tail. In some implementations, all guards and tails associated with each other must reside within a single instruction bundle.

Some instruction boundaries (represented by the vertical lines of the instruction set bundle 210) can be associated with verification assertions. A verification assertion is an annotation stating a condition to be verified before the instruction is executed (e.g., a particular instruction has been sandboxed). A guard instruction 212a discharges the verification assertion by testing whether the asserted condition is true. The bundle 210 also includes a NOP (non-operative instruction) padding region 214 to maintain the bundle's size (e.g., length in bytes), support the bundle's alignment relative to other bundles (e.g., ensure that the bundles' starting addresses are aligned), or both. For example, in some implementations, all bundles are constrained to a same length. Consequently, one or more NOP padding regions can be added to instruction bundles having instructions that do not reach the specified length. An SFI analysis of a bundle 210, performed to guarantee its safe execution, can include verifying constraints applied to the bundle size, the bundle alignment, and locations of the instruction boundaries within the bundle. SFI analysis also can include verification of the correctness of software guards.

FIG. 2B illustrates an example verifiably safe code region 280 that is composed of five contiguous instruction set bundles 210, 220, 230, 240, and 250. The alignment and size properties of instruction set bundles and code regions can be chosen based on attributes of the hardware architecture within which they are implemented. For example, the code region 280 illustrated in FIG. 2B is optimized for an x86 architecture that uses segmented memory, and thus a verifiably safe code region can be constrained to be composed of 32-byte fixed-width instruction set bundles that start at aligned addresses (e.g., the starting address of each bundle is aligned with the starting address of each other bundle in the region 280). In some alternative implementations, the choices of alignment and size constraints of instruction set bundles and code regions is based on other types of optimizations. In some alternative implementations, the instruction set bundles and code regions are not subject to alignment constraints, but can be subject to other constraints on control flow. For example, a verifiably safe code region can contain contiguous variable-length instruction set bundles with non-aligned starting edges.

In some implementations, the system (e.g., an SFI system) verifies safe execution of the code region 280 by constraining the flow of execution to be within verifiably safe code memory. For example, each jump instruction (an instruction that changes the location of the instruction pointer as illustrated by the example instruction 222 in bundle 220) is verified to have a target address that is within its verifiably safe code region, and each call instruction (an instruction specifying a subroutine branch target address and a return address as illustrated by the example instruction 224 in bundle 240) is verified to specify a target address and a return address that are, respectively, at the start of instruction bundles that are located within a verifiably safe code region.

Figure 3:
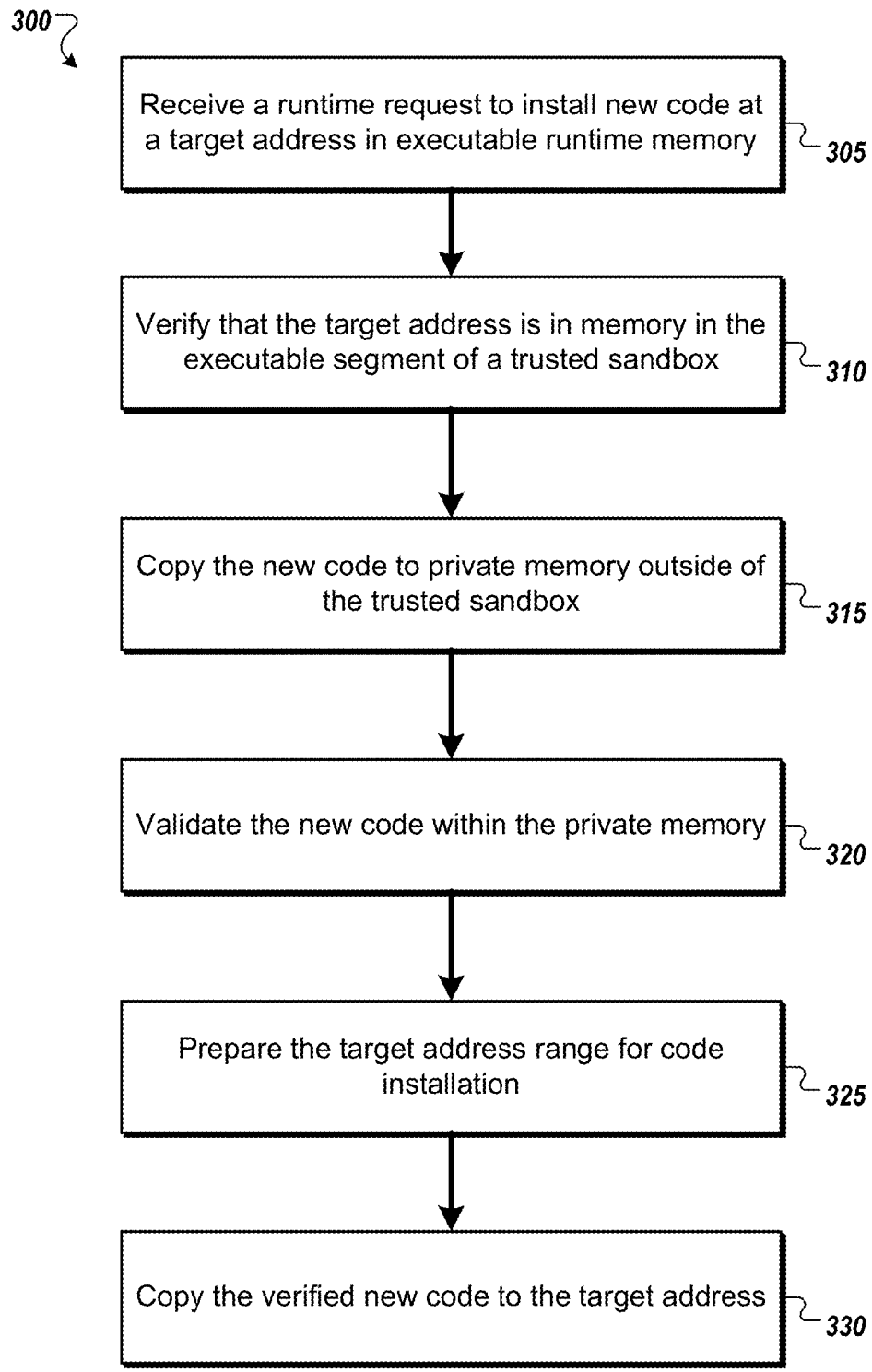
FIG. 3 is a flow diagram of an example method for performing safe dynamic creation of a verifiably safe code region within executable runtime memory.

FIG. 3 is a flow diagram of an example method 300 for performing safe dynamic creation of a verifiably safe code region within executable runtime memory. For convenience, the method 300 will be described with respect to a system that includes one or more computing devices and performs the method 300.

The system receives 305 a runtime request to install new code with associated, potentially-empty, metadata at a target address in executable runtime memory. In some implementations, the request is received using a program interface (e.g., program interface 105 of FIG. 1). The target address specified in the request is verified 310 to be located within the executable segment of the verifiably safe sandbox (e.g., sandbox 110). Additionally, in some implementations where each verifiably safe code region's instruction bundle boundaries are aligned (e.g., code region 280), the target address is verified to be aligned to the start address of each of the instruction bundles within the target code region.

To avoid a time-of-test/time-of-use race condition, the system copies 315 the new code to private memory outside of the trusted sandbox and performs the validation within the private memory. In some implementations, new code validation is performed by a same verifiably safe system validator that was used to create the trusted sandbox. Validation of a new code region includes verifying the constraint that all execution control flow between trusted code regions within the system, whether direct or computed, targets the start of an instruction bundle.

The system prepares 325 a target address range in executable memory for installation of the new code. In some implementations, the preparation includes checking the target address to ensure that it is unused, and reserving the address range if it is determined to be unused. In some implementations, checking and reserving the target address range are performed as one atomic operation.

Once the new code and the installation memory location have been verified, the system copies 330 the new code to the target address. In some implementations, unused executable memory is filled with HLT instructions (i.e., instructions that halt execution) to ensure that no incorrect executable instructions remain within the unused memory. For safe copying of verified code regions, the first byte of each instruction bundle to be copied is written as a HLT instruction until all other code bytes have been copied. Then, the first byte of each instruction bundle is written with the intended value.

Figure 4:
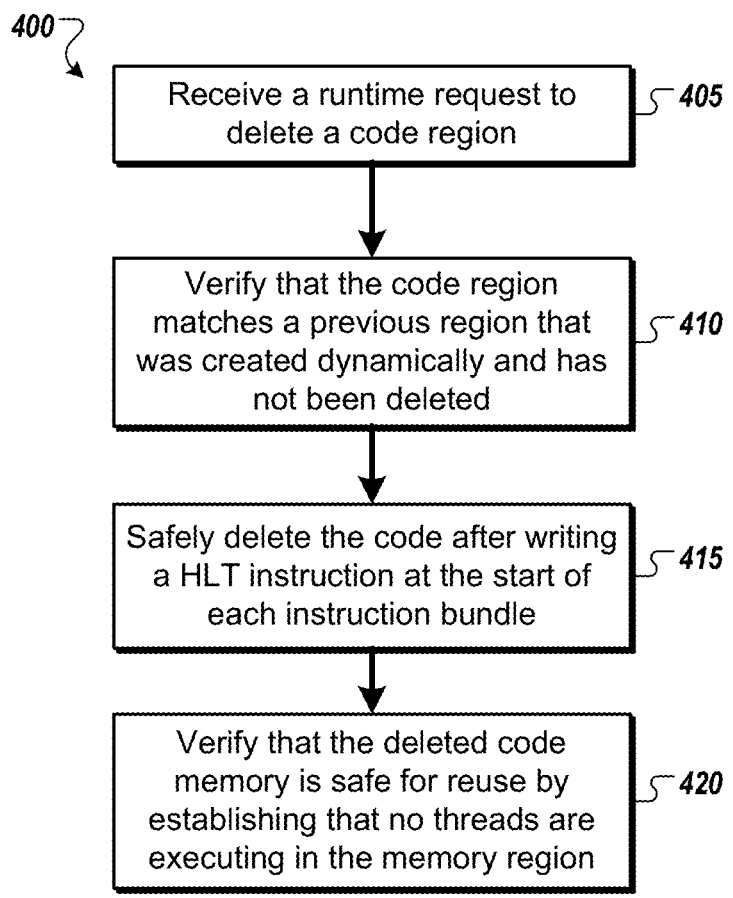
FIG. 4 is a flow diagram of an example method for performing safe dynamic deletion of a verifiably safe code region from executable runtime memory.

FIG. 4 is a flow diagram of an example method 400 for performing safe dynamic deletion of a verifiably safe code region from executable runtime memory. For convenience, the method 400 will be described with respect to a system that includes one or more computing devices and performs the method 400. As set forth above with respect to FIG. 1, a verifiably safe code region may be deleted at runtime so that its executable memory can be reused for installation of new machine code.

To ensure safety, code region deletion includes a mechanism to prevent the code region's executable memory from being changed (e.g., by replacement of code stored within the memory) while executing threads are positioned within the memory. For example, a sleeping thread could wake up and resume executing in the middle of an instruction because replacement instructions written into the thread's memory location overwrote the original set of instruction boundaries. Since software threads subsume hardware threads (i.e., during execution all software threads are either asleep or bound to hardware threads), the system can ensure that executable memory about to be changed is not being used by verifying that no active software thread is positioned within that memory.

After receiving 405 a runtime request to delete a verifiably safe code region, the system verifies 410 that the code region matches a previous region that was created dynamically and has not been deleted.

To ensure that no new threads enter the code region while the code is being deleted 415, the system writes a HLT instruction at the start of each instruction bundle in the region. Executing the HLT instruction will halt any thread that tries to enter the code region because, as described above, the system applies constraints such that control flows within and returns to any verifiably safe region always target the start of an instruction bundle. Once the code has been deleted, the system verifies 420 that the deleted code memory is safe for reuse by establishing that no threads are executing in the memory region. One example method for establishing that no threads are executing in the memory region is described below with respect to FIG. 5.

Figure 5:
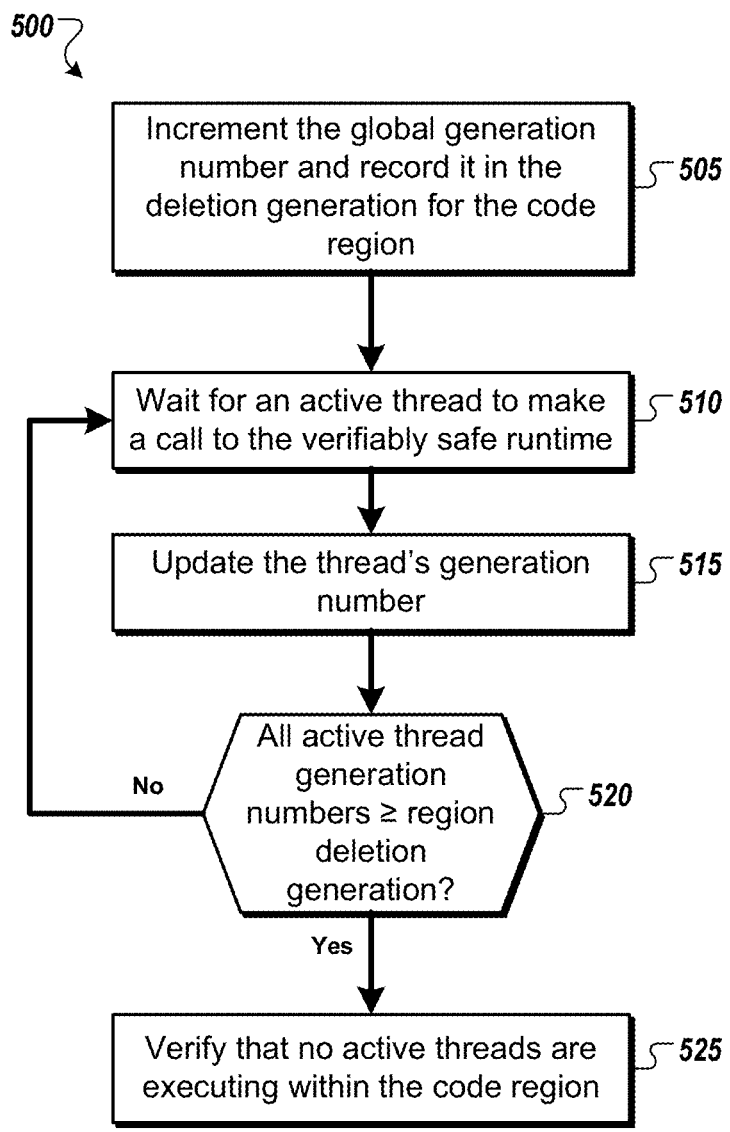
FIG. 5 is a flow diagram of an example method for performing a "wind down" strategy to insure that no threads are executing within an executable memory region.

FIG. 5 is a flow diagram of an example method 500 for implementing a "wind down" strategy to ensure that no threads are executing within an executable memory region. For convenience, the method 500 will be described with respect to a system that includes one or more computing devices and performs the method 500. In some implementations, the method 500 is performed to verify that a memory region is safe for reuse after deleting a particular code region, for example, as described above with respect to FIG. 4.

The system increments its global generation number (a reference tag used to track the chronology of system events), and then the system records the global generation number as the delete generation for the code region 505.

The system enumerates the active threads, for example, by referencing a table listing the active threads. The system verifies the position of an active thread by waiting 510 for the active thread to make a call into the verifiably safe runtime and then noting the event. In some implementations, the call into the verifiably safe runtime is a system call. Once a thread makes the call into the verifiably safe runtime, the system notes the event by updating 515 the thread generation number to be the current global generation number. The system determines 520 whether or not all active threads have called into the verifiably safe runtime by comparing the generation numbers of the active threads to the delete generation number. A thread that has made the call will have a thread generation number that is greater than or equal to the delete generation number. If the system determines that there still are active threads that have not yet made the call, the system continues to wait 510 for a next thread to make the call. If the system determines that all threads have made the call, the system verifies 525 that no thread is executing within the region to be deleted. The safety constraints associated with a verifiably safe region ensure that should a thread (incorrectly) attempt to resume execution in the region once it is verified, the thread will resume execution safely at the aligned start of an instruction bundle rather than in the middle of an instruction.

In some implementations, the method 500 can be implemented as a non-blocking method so that user threads invoking the method can perform useful work and not be blocked while waiting for the system to release executable memory for reuse. If only one thread is executing, an invocation of a code deletion method that incorporates a wind down strategy can return a success code immediately. However, if multiple threads are executing in the system and blocking might occur, the first invocation of a non-blocking code deletion method will return with an error code EAGAIN. The method can be re-invoked with the same arguments until it returns a success code indicating that the system finally has verified that safe deletion has been made and that memory is available for reuse.

Figure 6:
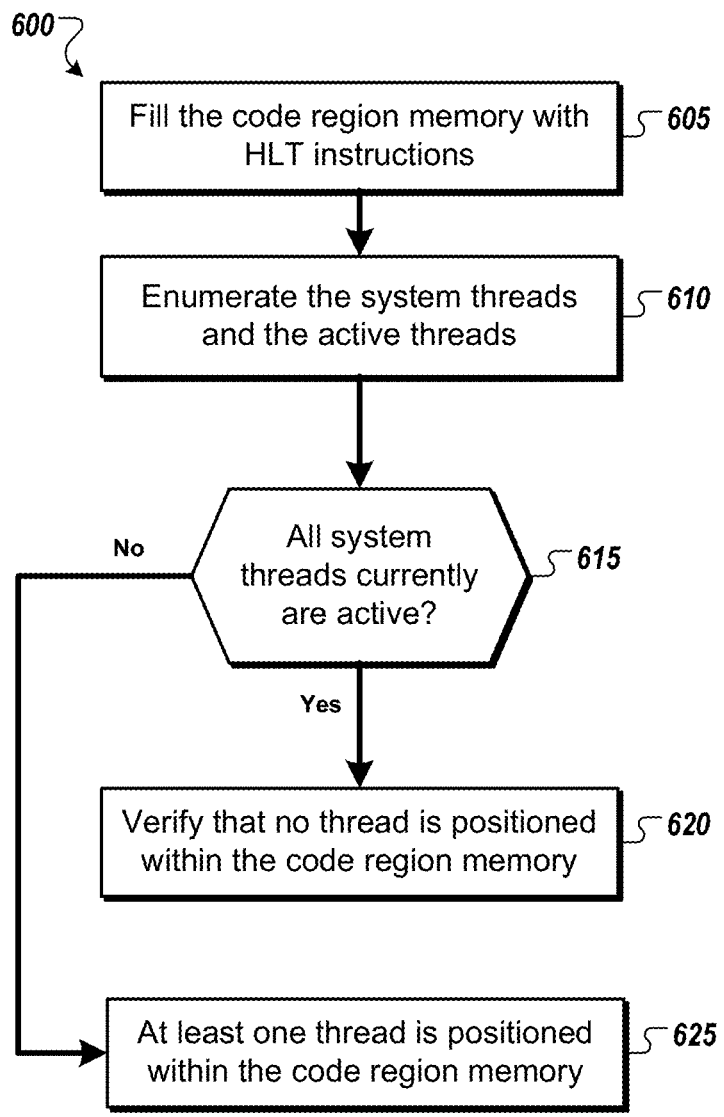
FIG. 6 is a flow diagram of an example method for determining whether executable memory is available for reuse.

FIG. 6 is a flow diagram of an example method 600 for determining whether executable memory is available for reuse. For convenience, the method 600 will be described with respect to a system that includes one or more computing devices and performs the method 600. In some implementations, the method 600 is performed to verify asynchronously that executable memory is free for reuse after deleting a particular code region, for example, as described above with respect to FIG. 4. Implementing method 600 rather than a wind down strategy according to method 500 can be advantageous for systems having limited memory resources, because it does not necessitate waiting until all executing threads make the call into verifiably safe memory in order to verify that the memory can be reused.

The system fills 605 the deleted code memory region with HLT instructions, and enumerates 610 the system threads and the active threads. The system determines 615 if all system threads currently are active threads. If all system threads are active threads, it can be inferred that no threads are executing in the deleted code region, because an active thread is executing and not halted. If no threads are executing in the deleted code region, the system can verify 620 that no thread is positioned in the memory region. Alternatively, the system can force all active threads to halt, and then verify 620 that no thread is positioned in the deleted code memory region or about to execute a HLT by inspecting the position and state of each halted thread.

In some implementations, the system performs safe runtime modification of machine code instructions implemented as an atomic operation (e.g., if a thread invokes a method to modify an instruction, then concurrent threads should execute either the old instruction or the new instruction, but no other instruction).

In some implementations, the safe atomic instruction modification is performed at the instruction bundle level of granularity, because, as described above, there are safety constraints that preserve the bundle boundaries. In some implementations, safe runtime code modification includes adding instruction boundaries to a region by breaking up larger instructions into smaller instructions. In this way, a code region can be modified by adding new instructions while the original instruction boundaries are preserved.

To perform safe, atomic replacement of an old target instruction within an instruction bundle, the system replaces one instruction at a time within the bundle in compliance with a set of constraints. The constraints can include, without limitation, one or more of the following: The new code replacing the old code must satisfy all SFI system safety verification constraints; both new and old code must start at the same address, be of equal size, and lie within a single code region; any direct control-transfer instructions in the new code must target valid instruction boundaries within the same code region; both the new code and the old code must start and end at instruction boundaries; all instruction boundaries within the new code must be identical to instruction boundaries within the old code; and the new code must contain all the pseudo-instructions (with identical guard instructions) that were in the old code.

For some hardware architectures that support 8-byte instruction boundaries, it is possible for safe replacement of an old target instruction (OLDI) with a new instruction (NEWI) by implementing a "fast path" in which a target instruction that does not cross an 8-byte boundary is replaced by making a single 8-byte, aligned write to memory. The example pseudo-code in Table 2 illustrates an implementation of atomic instruction modification that includes the fast path.

TABLE 2

Example pseudo-code for atomic modification of an instruction

```
// for an instruction pair OLDI and NEWI
if ( diff of (OLDI , NEWI ) is aligned qword ) {
    // fast path
    atomic aligned qword write to update OLDI ;
} else {
    // slow path
    OLDI [0] = 0 xf4 ;              /* HLT instruction */
    serialize ( );                  /* barrier */
    OLDI [1: n] = NEWI [1: n];
    serialize ( );                  /* barrier */
    OLDI [0] = NEWI [0];
}
```

Figure 7:
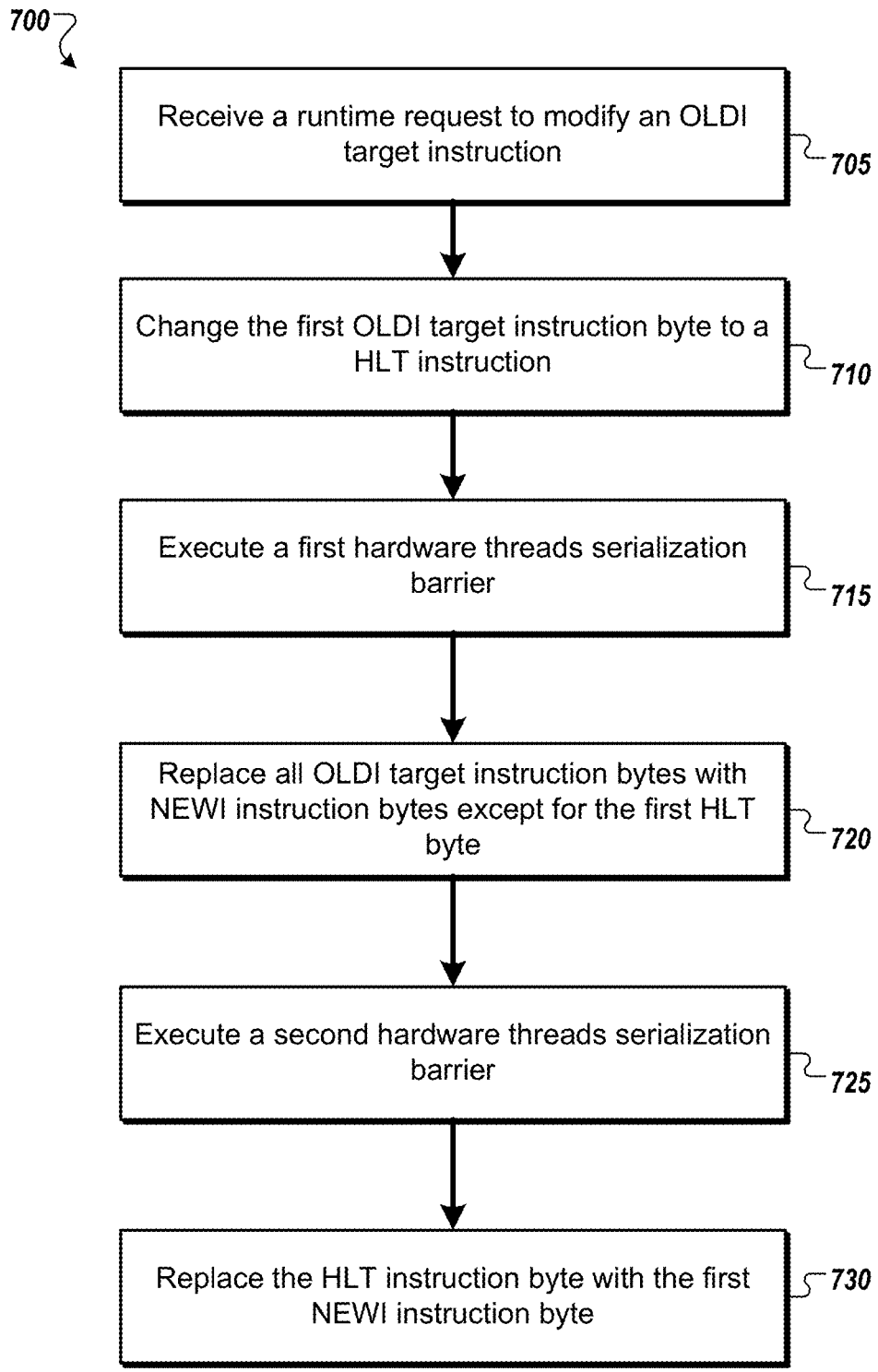
FIG. 7 is a flow diagram of an example method for performing safe runtime modification of a machine code instruction.

FIG. 7 is a flow diagram of an example method 700 for performing safe runtime modification of a machine code instruction. For convenience, the method 700 will be described with respect to a system that includes one or more computing devices and performs the method 700. The method 700 is an example implementation of a "slow path" for safe replacement of instruction OLDI with NEWI. As illustrated in the pseudo-code example in Table 2, a slow path can be used when a hardware architecture or system configuration does not satisfy the constraints for using a fast path. A single method implementation of a safe atomic instruction modification can include either a fast path or a slow path, or the method can implement both alternatives as illustrated in Table 2.

The system receives 705 a runtime request to modify an OLDI target instruction. The system changes 710 the first byte of the OLDI target instruction initially to a HLT instruction to prevent the execution of the target instruction during its modification. The system then executes 715 a first serialization barrier in order to serialize the system hardware threads to the content of memory. Before this point, a concurrent thread will execute either the original OLDI instruction or the HLT instruction. After execution of the serialization barrier, no threads can execute the OLDI target instruction without executing the HLT instruction.

There are several alternative implementations for executing a serialization barrier. The selection of a particular implementation used can be based on, for example, the hardware architecture, the SFI system extension implementation, or a combination of both. For example, a common approach on x86 processors is to use a serializing kernel-mode instruction (e.g., cpuid) on all hardware threads. Alternatively, in some implementations in which runtime verifiably safe instruction modification is invoked from a user-mode interface (e.g., interface 105), the serialization barrier can be triggered from user-mode as a side-effect of a system call. For example, the mprotect system call that changes protections for pages within the page table triggers inter-processor interrupts of remote hardware threads, serializing all processors as a side-effect. In some other implementations, the processor provides a user-mode instruction for sending out blanket thread notifications, enabling a serialization barrier to be implemented from user-mode directly and not as a side-effect.

After the first serialization barrier is executed, the system replaces 720 all bytes in the OLDI target instruction with bytes from the NEWI instruction except for the HLT instruction byte. The system executes 725 a second serialization barrier, and, after execution of the second serialization barrier, a concurrent thread will execute either the NEWI instruction or the HLT instruction. Finally, the system replaces 720 the HLT instruction byte with the intended NEWI byte, ensuring that all the concurrent threads execute the NEWI instruction.

In some implementations, safe runtime code optimization is performed by replacing the NOP padding regions (e.g., NOP regions 214 shown in FIG. 2) of an instruction bundle with high-performance NOP regions having the same length. The system maintains a table of high-performance NOP regions of various lengths, and can perform the NOP padding substitution as an optimization for an instruction bundle being modified.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, (e.g., a machine-generated electrical, optical, or electromagnetic signal) that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising:
one or more computers and one or more storage devices storing instructions that are operable, when executed by the one or more computers, to cause the one or more computers to implement an extended Software Fault Isolation (SFI) software sandboxing system configured to perform operations comprising:
providing a user-mode program interface operable to receive runtime requests to modify an executable memory region of a trusted sandbox, wherein the requests comprise requests to perform dynamic code creation; and
for each runtime request to perform dynamic code creation:
receiving new machine code and a code installation target address,
verifying that the target address is in the executable memory region of the trusted sandbox,
copying the new machine code to private memory located outside of the trusted sandbox,
validating the new machine code in the private memory location,
determining a target address range within which the new machine code will be installed,
performing an operation on the target address range to verify that the target address range is currently unused memory and to reserve the target address range for installation of the new machine code, and
copying the validated new machine code to the target address.

2. The system of claim 1, wherein the validated new machine code comprises at least one instruction bundle, and where copying the validated new machine code to the target address comprises:
filling the target address range with halt (HLT) instructions; and
copying each validated new machine code instruction bundle into the target address range, the copying of each validated new machine code instruction bundle including:
writing the instruction bundle first byte into the target address range as a HLT instruction,
copying all instruction bundle bytes after the first byte into the target address range, and
replacing the first byte HLT instruction with the instruction bundle first byte.

3. The system of claim 1, wherein the requests further comprise runtime dynamic code deletion requests, and for each runtime dynamic code deletion request, the operations comprise:
receiving a specification of a code region to delete from executable memory;
verifying that the code region was previously created with a request to perform dynamic code creation;
safely deleting machine code from the specified code region; and
verifying that the specified code region is safe for reuse by establishing that no active threads are executing instructions within the specified code region.

4. The system of claim 3, wherein the specified code region comprises a plurality of contiguous instruction bundles, and where safely deleting machine code from the specified code region includes:
writing a HLT instruction at the start of each of the instruction bundles; and
deleting each of the instruction bundles.

5. The system of claim 3, wherein establishing that no active threads are executing instructions within the specified code region comprises:
incrementing a system global generation number;
assigning the global generation number to a code region delete generation number;
enumerating the system active threads;
updating a thread generation number for an active thread in response to the thread making a call into verifiably safe system runtime;
determining whether each of the active threads has a thread generation number that is greater than or equal to the code region delete generation number; and
verifying that no active threads are executing instructions within the specified code region when each of the active threads has a generation number that is greater than or equal to the code region delete generation number.

6. The system of claim 3, wherein establishing that no active threads are executing instructions within the specified code region comprises:
filling the specified code region with HLT instructions;
enumerating the system threads;
determining whether each of the system threads is an active thread; and
establishing that no active threads are executing instructions within the specified code region if each of the system threads is an active thread.

7. The system of claim 1, wherein the requests further comprise requests for atomic modification of machine code instructions, and for each runtime request for atomic modification of machine code instructions, the operations comprise:
receiving target instructions to be replaced and new instructions to replace the target instructions, wherein the target instructions are located within an instruction bundle that is located within a code region that was previously created with a request to perform dynamic code creation; and modifying the instruction bundle by replacing the target instructions with the new instructions.

8. The system of claim 7, wherein modifying the instruction bundle comprises validating machine code instructions.

9. The system of claim 8, wherein validating machine code instructions comprises verifying that the machine code instructions satisfy at least one or more safety constraints comprising:
the target instructions and the new instructions start at the same address, are of equal size, and are located within a single code region;
any new direct control-transfer instructions target valid instruction boundaries in the code region that was previously created with a request to perform dynamic code creation;
the target instructions and the new instructions start and end at instruction boundaries, and if one or more instruction boundaries are between the start and the end, the one or more instruction boundaries are identical in the target instructions and the new instructions;
pseudo-instructions are neither added nor removed from the instruction bundle; and
each new pseudo-instruction and corresponding target pseudo-instruction being replaced have identical guard instructions.

10. The system of claim 7, wherein replacing a target instruction with a new instruction comprises:
changing a first byte of a target instruction to a HLT instruction;
executing a first hardware threads serialization barrier;
replacing all target instruction bytes except for the HLT instruction byte with corresponding new instruction bytes;
executing a second hardware threads serialization barrier; and
replacing the HLT instruction byte with the new instruction first byte.

11. The system of claim 10, wherein executing the first hardware threads serialization barrier is triggered as a side-effect of invoking a system call to modify page tables.

12. The system of claim 10, wherein executing the first hardware threads serialization barrier comprises sending blanket thread notifications in response to invoking a user-mode instruction.

13. A non-transitory computer storage medium encoded with a computer program, the program comprising instructions that when executed by data processing apparatus cause the data processing apparatus to implement an extended Software Fault Isolation (SFI) software sandboxing system configured to perform operations comprising:
providing a user-mode program interface operable to receive runtime requests to modify an executable memory region of a trusted sandbox, wherein the requests comprise requests to perform dynamic code creation; and
for each runtime request to perform dynamic code creation:
receiving new machine code and a code installation target address,
verifying that the target address is in the executable memory region of the trusted sandbox,
copying the new machine code to private memory located outside of the trusted sandbox,
validating the new machine code in the private memory location,
determining a target address range within which the new machine code will be installed,
performing an operation on the target address range to verify that the target address range is currently unused memory and to reserve the target address range for installation of the new machine code, and
copying the validated new machine code to the target address.

14. The computer storage medium of claim 13, wherein the validated new machine code comprises at least one instruction bundle, and where copying the validated new machine code to the target address comprises:
filling the target address range with halt (HLT) instructions; and
copying each validated new machine code instruction bundle to the target address range, the copying of each validated new machine code instruction bundle including:
writing the instruction bundle first byte into the target address range as a HLT instruction,
copying all instruction bundle bytes after the first byte into the target address range, and
replacing the first byte HLT instruction with the instruction bundle first byte.

15. The computer storage medium of claim 13, wherein the requests further comprise runtime dynamic code deletion requests, and for each runtime dynamic code deletion request, the operations comprise:
receiving data associated with the code deletion request, the data comprising a specification of a code region to delete from executable memory;
verifying the code region was previously created with a request to perform dynamic code creation;
safely deleting machine code from the specified code region; and
verifying that the specified code region is safe for reuse by establishing that no active threads are executing instructions within the specified code region.

16. The computer storage medium of claim 15, wherein the specified code region comprises a plurality of contiguous instruction bundles, and where safely deleting machine code from the specified code region includes:
writing a HLT instruction at the start of each of the instruction bundles; and
deleting each of the instruction bundles.

17. The computer storage medium of claim 15, wherein establishing that no active threads are executing instructions within the specified code region comprises:
incrementing a system global generation number;
assigning the global generation number to a code region delete generation number;
enumerating the system active threads;
updating a thread generation number for an active thread in response to the thread making a call into verifiably safe system runtime;
determining whether each of the active threads has a thread generation number that is greater than or equal to the code region delete generation number; and
verifying that no active threads are executing instructions within the specified code region when each of the active threads has a generation number that is greater than or equal to the code region delete generation number.

18. The computer storage medium of claim 16, wherein establishing that no active threads are executing instructions within the specified code region comprises:
filling the specified code region with HLT instructions;
enumerating the system threads;
determining whether each of the system threads is an active thread; and establishing that no active threads are executing instructions within the specified code region if each of the system threads is an active thread.

19. The computer storage medium of claim 13, wherein the requests further comprise requests for atomic modification of machine code instructions, and for each runtime request for atomic modification of machine code instructions, the operations comprise:
   receiving target instructions to be replaced and new instructions to replace the target instructions, wherein the target instructions are located within an instruction bundle that is located within a code region that was previously created with a request to perform dynamic code creation; and
   modifying the instruction bundle by replacing the target instructions with the new instructions.

20. The computer storage medium of claim 19, wherein modifying the instruction bundle comprises validating machine code instructions.

21. The computer storage medium of claim 20, wherein validating machine code instructions comprises verifying that the machine code instructions satisfy at least one or more safety constraints comprising:
   the target instructions and the new instructions start at the same address, are of equal size, and are located within a single code region;
   any new direct control-transfer instructions target valid instruction boundaries in the code region that was previously created with a request to perform dynamic code creation;
   the target instructions and the new instructions start and end at instruction boundaries, and if one or more instruction boundaries are between the start and the end, the one or more instruction boundaries are identical in the target instructions and the new instructions;
   pseudo-instructions are neither added nor removed from the instruction bundle; and
   each new pseudo-instruction and corresponding target pseudo-instruction being replaced have identical guard instructions.

22. The computer storage medium of claim 19, wherein replacing a target instruction with a new instruction comprises:
   changing a first byte of a target instruction to a HLT instruction;
   executing a first hardware threads serialization barrier;
   replacing all target instruction bytes except for the HLT instruction byte with corresponding new instruction bytes;
   executing a second hardware threads serialization barrier; and
   replacing the HLT instruction byte with the new instruction first byte.

23. The computer storage medium of claim 22, wherein executing the first hardware threads serialization barrier is triggered as a side-effect of invoking a system call to modify page tables.

24. The computer storage medium of claim 22, wherein executing the first hardware threads serialization barrier comprises sending blanket thread notifications in response to invoking a user-mode instruction.

25. A method performed by an extended Software Fault Isolation (SFI) software sandboxing system comprising:
   providing a user-mode program interface operable to receive runtime requests to modify an executable memory region of a trusted sandbox, wherein the requests comprise requests to perform dynamic code creation; and
   for each runtime request to perform dynamic code creation:
      receiving new machine code and a code installation target address,
         verifying that the target address is in the executable memory region of the trusted sandbox,
         copying the new machine code to private memory located outside of the trusted sandbox,
         validating the new machine code in the private memory location,
         determining a target address range within which the new machine code will be installed,
         performing an operation on the target address range to verify that the target address range is currently unused memory and to reserve the target address range for installation of the new machine code, and
         copying the validated new machine code to the target address.

26. The method of claim 25, wherein the validated new machine code comprises at least one instruction bundle, and where copying the validated new machine code to the target address comprises:
   filling the target address range with halt (HLT) instructions; and
   copying each validated new machine code instruction bundle to the target address range, the copying of each validated new machine code instruction bundle including:
      writing the instruction bundle first byte into the target address range as a HLT instruction,
      copying all instruction bundle bytes after the first byte into the target address range, and
      replacing the first byte HLT instruction with the instruction bundle first byte.

27. The method of claim 25, wherein the requests further comprise runtime dynamic code deletion requests, and for each runtime dynamic code deletion request, the method further comprises:
   receiving data associated with the code deletion request, the data comprising a specification of a code region to delete from executable memory;
   verifying the code region was previously created with a request to perform dynamic code creation;
   safely deleting machine code from the specified code region; and
   verifying that the specified code region is safe for reuse by establishing that no active threads are executing instructions within the specified code region.

28. The method of claim 27, wherein the specified code region comprises a plurality of contiguous instruction bundles, and where safely deleting machine code from the specified code region includes:
   writing a HLT instruction at the start of each of the instruction bundles; and
   deleting each of the instruction bundles.

29. The method of claim 27, wherein establishing that no active threads are executing instructions within the specified code region comprises:
   incrementing a system global generation number;
   assigning the global generation number to a code region delete generation number;
   enumerating the system active threads;

updating a thread generation number for an active thread in response to the thread making a call into verifiably safe system runtime;

determining whether each of the active threads has a thread generation number that is greater than or equal to the code region delete generation number; and verifying that no active threads are executing instructions within the specified code region when each of the active threads has a generation number that is greater than or equal to the code region delete generation number.

30. The method of claim 27, wherein establishing that no active threads are executing instructions within the specified code region comprises:

filling the specified code region with HLT instructions;

enumerating the system threads;

determining whether each of the system threads is an active thread; and establishing that no active threads are executing instructions within the specified code region if each of the system threads is an active thread.

31. The method of claim 25, wherein the requests further comprise runtime requests for atomic modification of machine code instructions, and for each runtime request for atomic modification of machine code instructions, the method further comprises:

receiving target instructions to be replaced and new instructions to replace the target instructions, wherein the target instructions are located within an instruction bundle that is located within a code region that was previously created with a request to perform dynamic code creation; and modifying the instruction bundle by replacing the target instructions with the new instructions.

32. The method of claim 31, wherein modifying the instruction bundle comprises validating machine code instructions.

33. The method of claim 32, wherein validating machine code instructions comprises verifying that the machine code instructions satisfy at least one or more safety constraints comprising:

the target instructions and the new instructions start at the same address, are of equal size, and are located within a single code region;

any new direct control-transfer instructions target valid instruction boundaries in the code region that was previously created with a request to perform dynamic code creation;

the target instructions and the new instructions start and end at instruction boundaries, and if one or more instruction boundaries are between the start and the end, the one or more instruction boundaries are identical in the target instructions and the new instructions;

pseudo-instructions are neither added nor removed from the instruction bundle; and each new pseudo-instruction and corresponding target pseudo-instruction being replaced have identical guard instructions.

34. The method of claim 31, wherein replacing a target instruction with a new instruction comprises:

changing a first byte of a target instruction to a HLT instruction;

executing a first hardware threads serialization barrier;

replacing all target instruction bytes except for the HLT instruction byte with corresponding new instruction bytes;

executing a second hardware threads serialization barrier; and replacing the HLT instruction byte with the new instruction first byte.

35. The method of claim 34, wherein executing the first hardware threads serialization barrier is triggered as a side-effect of invoking a system call to modify page tables.

36. The method of claim 34, wherein executing the first hardware threads serialization barrier comprises sending blanket thread notifications in response to invoking a user-mode instruction.

* * * * *